United States Patent [19]

Wada et al.

[11] Patent Number: 5,194,104
[45] Date of Patent: Mar. 16, 1993

[54] CORE ASSEMBLY FOR PNEUMATIC TIRE

[75] Inventors: Mitsunori Wada; Shungo Ito, both of Kodaira, Japan

[73] Assignee: Bridgestone Corporation, Tokyo, Japan

[21] Appl. No.: 730,681

[22] Filed: Jul. 16, 1991

[30] Foreign Application Priority Data

Jul. 23, 1990 [JP] Japan .................. 2-194392

[51] Int. Cl.$^5$ .............................................. B60C 17/04
[52] U.S. Cl. ...................................... 152/152; 152/158; 152/520
[58] Field of Search ............... 152/152, 153, 155, 158, 152/516, 520, 521

[56] References Cited

U.S. PATENT DOCUMENTS

Re. 28,196 10/1974 Patecell .
3,682,219 8/1972 Lindley .................. 152/158
4,258,767 3/1981 Wilde .................... 152/158

FOREIGN PATENT DOCUMENTS

55-3163 1/1980 Japan .
2-246811 10/1990 Japan .
3-121913 5/1991 Japan .

Primary Examiner—Michael W. Ball
Assistant Examiner—Nancy T. Krawczyk
Attorney, Agent, or Firm—Oliff & Berridge

[57] ABSTRACT

A core assembly for a pneumatic tire, which is fitted annularly to an outer peripheral surface of a well portion of a rim, and which rotates should the pneumatic tire collapse owing to a decline in its internal pressure, as an outer surface of the core assembly comes into contact with an inner peripheral surface of a crown portion of the pneumatic tire and an inner peripheral surface of the core assembly slides over the outer peripheral surface of the well portion of the rim. The core assembly includes a sliding portion formed of a resin material having good sliding properties and high heat resistance, and a main body to which the sliding member is secured and which is formed of a material having a high rigidity and a low specific gravity. Accordingly, since the surface of the core assembly contacting the rim is constituted by the sliding member, the core assembly is rotated smoothly when the internal pressure of the pneumatic tire declines, and the overal weight of the core assembly is reduced.

9 Claims, 8 Drawing Sheets

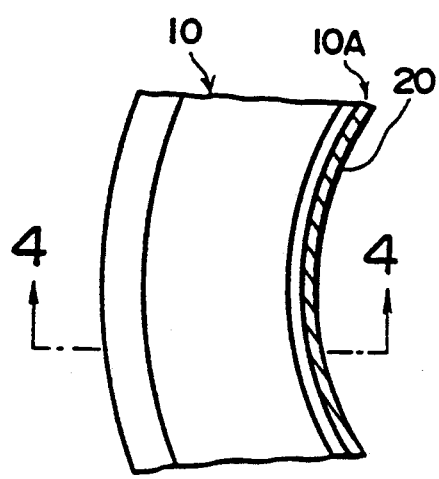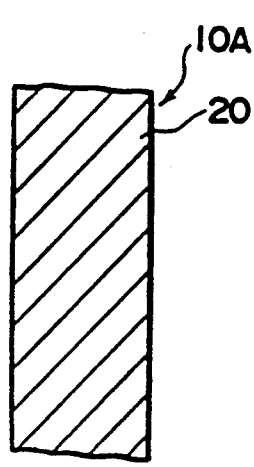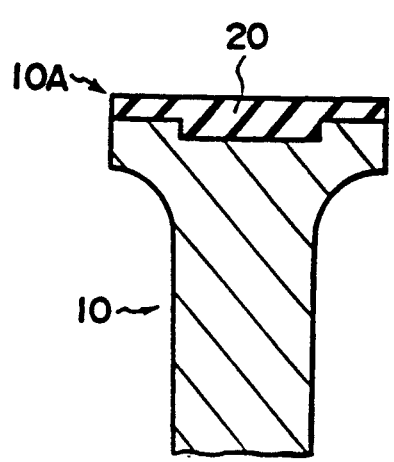

FIG. 6A
FIG. 6B
FIG. 6C
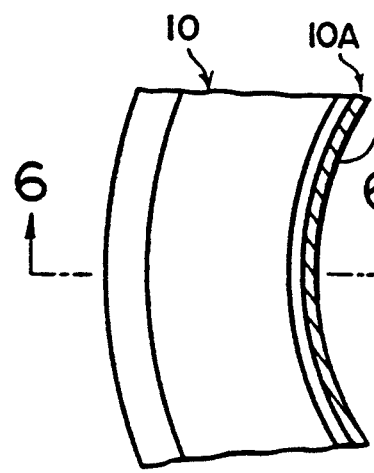
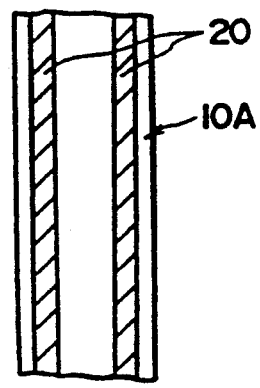
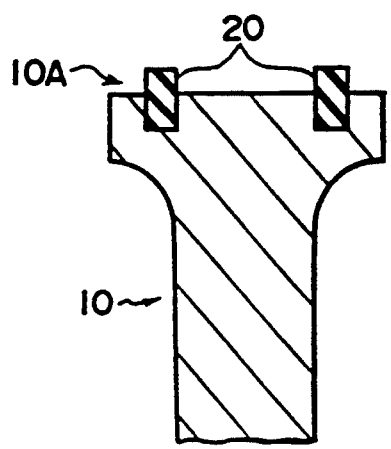

CORE ASSEMBLY FOR PNEUMATIC TIRE

BACKGROUND OF THE INVENTION

1. Field of the Invention

The present invention relates to a core assembly for a pneumatic tire which permits safe running for a fixed distance in the event that the internal pressure of the pneumatic tire has declined due to a puncture or the like.

2. Description of the Related Art

Conventionally, there are numerous examples in which a core assembly formed of a light-metal material having a high rigidity and a low specific gravity is fixed to a rim. In most of these examples, however, since the core assembly is secured to the rim by means of bolts or the like, there is a drawback in that, during flat running (punctured condition), friction occurs between the tire and the core assembly owing to the difference in circumferential length between the tire and the core assembly, with the result that damage is liable to occur to the tire.

In contrast, a rotary-type core assembly is known, as disclosed in Japanese Patent Publication Issue No. 55-3163. This core assembly is formed of a resilient material, and as the rim and the core assembly come into sliding contact with each other, an improved effect is attained by remarkably preventing damage to the tire. In the case of a tire with this rotary-type core assembly fitted therein, however, there is a drawback in that, in the case where flat running of a relatively long distance is effected in a heavy-load region or a high-speed region which can exist in practical use, the surface of the core assembly contacting a well portion of the rim becomes worn owing to the friction. This can give rise to vibrations, thereby rendering the running of the vehicle practically impossible.

SUMMARY OF THE INVENTION

In view of the above-described circumstances, it is an object of the present invention to provide a core assembly for a pneumatic tire which is capable of reducing the friction between contact surfaces, namely, the inner peripheral surface of the core assembly and a well portion of a rim, and which can be produced at low cost, is lightweight, and permits flat running for a relatively long distance.

To this end, in accordance with the present invention, there is provided a core assembly for a pneumatic tire, which is assembled into an annular configuration by connecting opposite ends of two or more arcuate members, is fitted to an outer peripheral surface of a well portion of a rim with the pneumatic tire mounted thereon, and is adapted to rotate if the pneumatic tire collapses owing to a decline in the internal pressure thereof, when an outer surface of the core assembly comes into contact with an inner peripheral surface of a crown portion of the pneumatic tire, and an inner peripheral surface of the core assembly slides over the outer peripheral surface of the well portion of the rim, comprising: a sliding portion constituting at least a portion of the inner peripheral surface of the core assembly and formed of a resin material having good sliding properties and high heat resistance, the sliding portion being capable of sliding over the outer peripheral surface of the well portion; and a remaining portion exclusive of the sliding portion and formed of a material having a high rigidity and a low specific gravity.

During normal running, the core assembly for a pneumatic tire of the present invention constructed as described above rotates integrally with the rim by means of friction between its sliding portion and the outer peripheral surface of the well portion of the rim. If the internal pressure of the pneumatic tire declines due to a puncture or the like, the ground-contacting portion of the pneumatic tire collapses, so that the inner peripheral surface of the crown portion comes into contact with the outer peripheral surface of the core assembly. At this juncture, the core assembly supports the crown portion of the pneumatic tire from the radially inward direction to prevent any further collapse, and permits the running (flat running) of the pneumatic tire in the state of reduced internal pressure. At the same time, the core assembly rotates by sliding over the outer peripheral surface of the well portion of the rim by means of a force imparted by the pneumatic tire, thereby preventing friction between the inner peripheral surface of the crown portion of the pneumatic tire and the outer peripheral surface of the core assembly. Accordingly, since a different material, i.e., a resin material having good sliding properties and high heat resistance is used only for the sliding portion constituting at least a portion of the inner peripheral surface of the core assembly, the core assembly in accordance with the present invention reduces the amount of heat generated due to friction between the core assembly and the well portion of the rim, or provides heat resistance. Hence, even if a vehicle is made to run at high speed under a heavy load after a drop in the internal pressure of the tire, flat running for a relatively long distance becomes possible without causing damage to the surface of the core assembly contacting the well portion of the rim owing to friction.

In addition, it is possible to reduce the overall weight of the core assembly since polyamide, polyimide, polyarylate, polyacetal, phenol resin, a resin material in which a filler or a reinforcing material is mixed, or a mixture of these resin materials is used for the sliding portion of the core assembly, and a highly rigid material having a low specific gravity such as a light-metal material, e.g., aluminum, magnesium, or an alloy thereof is used for the remaining portion of the core assembly other than the sliding portion. It should be noted with respect to the physical properties of the resin material, that it is preferred that the heat deformation temperature be 180° C. (18.6 kg/cm$^2$) or more, and that the critical PV value be 100 kg/cm$^2$·cm/sec or more.

In addition since the core assembly is formed of a resin material and a light-metal material, it is possible to reduce the cost of the core assembly as compared with the case in which the whole core assembly is formed of a resin material whose sliding properties and heat resistance are high, which is generally expensive.

Since the core assembly of the present invention is arranged as described above, the present invention offers outstanding advantages in that it is possible to reduce friction between contact surfaces, namely, the inner peripheral surface of the core assembly and the well portion of the rim, and in that the core assembly can be produced at low cost and can be made lightweight, and in that flat running for a relatively long distance is made possible.

The above and other objects, features and advantages of the present invention will become more apparent from the following detailed description of the invention when read in conjunction with the accompanying drawings.

BRIEF DESCRIPTION OF THE DRAWINGS

FIG. 4A is a partial side elevational view, taken along the axial dimension of the tire, of the core assembly for a pneumatic tire in accordance with the first embodiment;

FIG. 4B is a partial plan view, taken from the inner side in a radial direction, of the core assembly for a pneumatic tire in accordance with the first embodiment;

FIG. 4C is a fragmentary cross-sectional view taken along line 4—4 of FIG. 4A;

FIGS. 5A–5C, 6A–6C, 7A–7C, and 8A–8C are fragmentary diagrams of core assemblies for a pneumatic tire in accordance with other embodiments, respectively.

DESCRIPTION OF THE PREFERRED EMBODIMENTS

Referring now to FIGS. 1 to 4, a description will be given of a first embodiment of the present invention.

Figure 1:
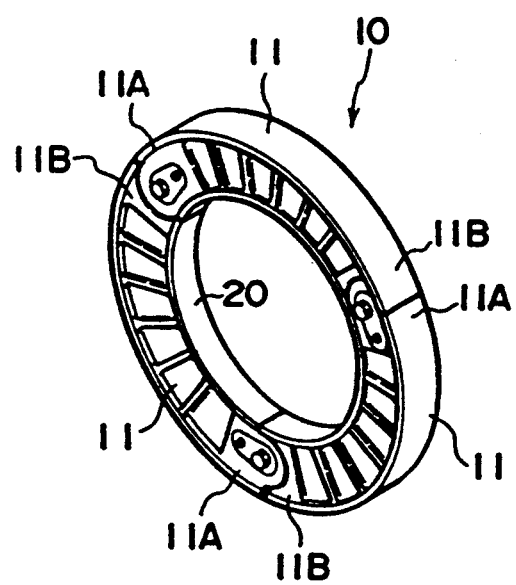
FIG. 1 is a perspective view of a core assembly for a pneumatic tire in accordance with a first embodiment of the present invention.

As shown in FIG. 1, a core assembly 10 in accordance with this embodiment comprises at least two (in this embodiment, three) known arcuate members 11, which are assembled into an annular configuration by connecting respective opposite ends 11A and 11B of the arcuate members 11 in an overlapping manner.

Figure 2:
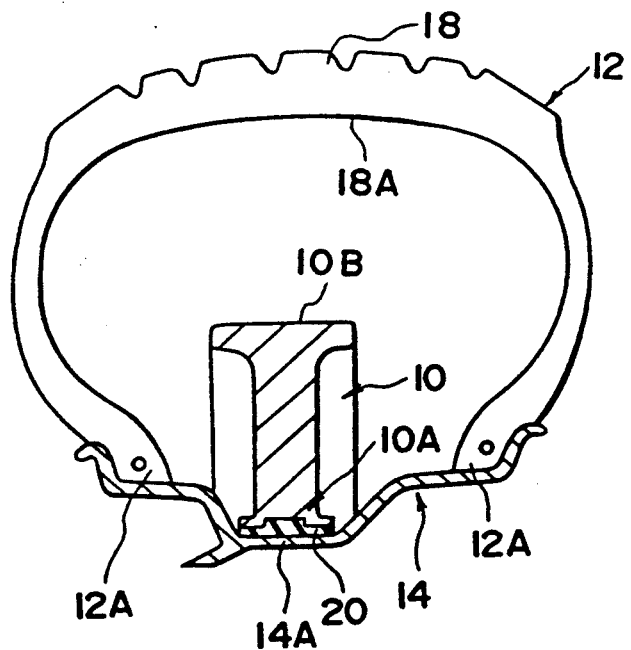
FIG. 2 is a cross-sectional view of a pneumatic tire with the core assembly for a pneumatic tire in accordance with the first embodiment fitted therein, the cross-sectional view being taken along the axial dimension of the tire.

As shown in FIG. 2, the cross-sectional configuration of the core assembly 10 taken in a circumferential direction thereof is substantially I-shaped, and an inner peripheral surface thereof is rotatably fitted in an outer peripheral surface of a well portion 14A of a rim 14 to which bead portions 12A of a pneumatic tire 12 are secured. A portion of the core assembly 10 other than the radially inward portion thereof, i.e., a main body, is formed of a highly rigid material having a low specific gravity such as a light-metal material, e.g., aluminum, magnesium, or an alloy thereof. An ohter peripheral surface 10B of the main body faces a central portion, with respect to the widthwise direction of the tire, of the inner peripheral surface 18A of a crown portion 18 of the pneumatic tire 12.

Figure 3:
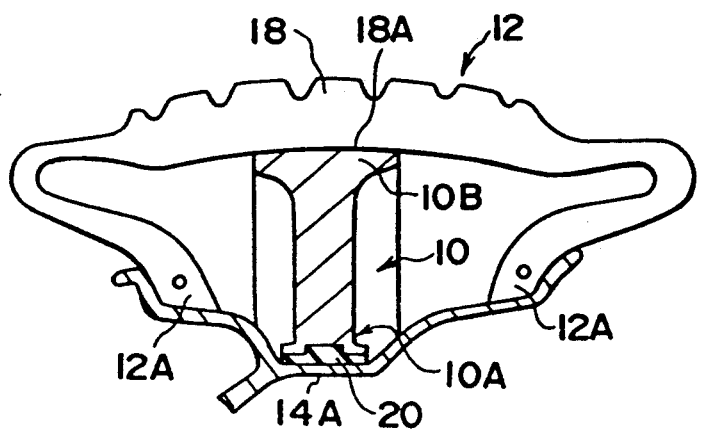
FIG. 3 is a cross-sectional view illustrating a flat-running state of the pneumatic tire with the core assembly for a pneumatic tire in accordance with the first embodiment fitted therein, the cross-sectional view being taken along the axial dimension of the tire.

As shown in FIGS. 3, 4A, and 4B, a resin material 20 which has good sliding properties and high heat resistance is secured to a radially inward portion 10A of the core assembly 10 constituting the inner peripheral surface thereof, i.e., a sliding portion, along the circumferential dimension thereof. As the resin material 20, it is possible to use materials such as polyamide, polyimide, polyarylate, polyacetal, phenol resin, a resin material in which a filler or a reinforcing material is mixed, or a mixture of these resin materials. As for the physical properties of the resin material 20, it is preferred that the heat deformation temperature be 180° C. (18.6 kg/cm$^2$) or more, and that the critical PV value be 100 kg/cm$^2$·cm/sec or more.

In addition, as shown in FIG. 4C, the resin material 20 is disposed over the entire inner peripheral surface of the core assembly 10, and the thickness of a widthwise central portion thereof is made greater than that of the remaining portions.

A description will now be given of the operation of this embodiment.

In this embodiment, during normal running, the core assembly 10 rotates integrally with the rim 14 by means of friction between its inner peripheral surface and the outer peripheral surface of the well portion 14A of the rim 14. If the internal pressure of the tire 12 declines due to a puncture or the like, the ground-contacting portion (upper side in FIG. 3) of the pneumatic tire 12 collapses, and the inner peripheral surface 18A of the crown portion 18 is brought into contact with the outer peripheral surface 10B of the core assembly 10, as shown in FIG. 3.

At this juncture, the core assembly 10 supports the crown portion 18 of the pneumatic tire 12 from the radially inward direction to prevent any further collapse, and permits the flat running of the pneumatic tire 12 in the state of reduced internal pressure. At the same time, the core assembly 10 rotates by sliding over the outer peripheral surface of the well portion 14A of the rim 14 by means of a force imparted by the pneumatic tire 12, thereby preventing friction between the inner peripheral surface 18A of the crown portion 18 of the pneumatic tire 12 and the outer peripheral surface 10B of the core assembly 10.

In addition, the resin material 20 is secured to the radially inward portion 10A of the core assembly 10, constituting the inner peripheral surface thereof, as mentioned above, so as to reduce the generation of heat due to friction between the core assembly 10 and the well portion 14A of the rim 14, or to provide heat resistance. Hence, even if the vehicle is made to run at high speed under a heavy load after a drop in the internal pressure, flat running for a relatively long distance becomes possible without causing damage to the surface of the core assembly 10 contacting the well portion 14A of the rim 14 owing to friction.

Figures 5A, 5B, 5C:
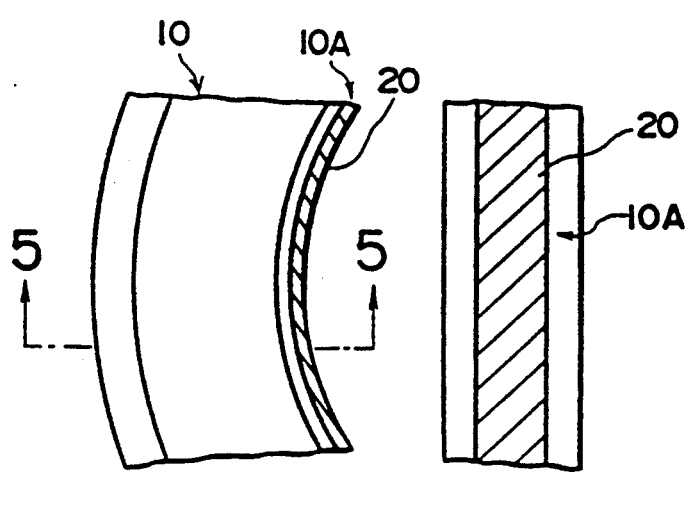

It should be noted that, as shown in FIGS. 5A–5C, the resin material 20 may be disposed only at the widthwise central portion of the radially inward portion 10A of the core assembly 10.

Alternatively, as shown in FIGS. 6A–6C, two rows of the resin material 20 may be disposed in parallel with each other in the vicinity of the widthwise opposite sides of the radially inward portion 10A of the core assembly 10.

Figure 7A:
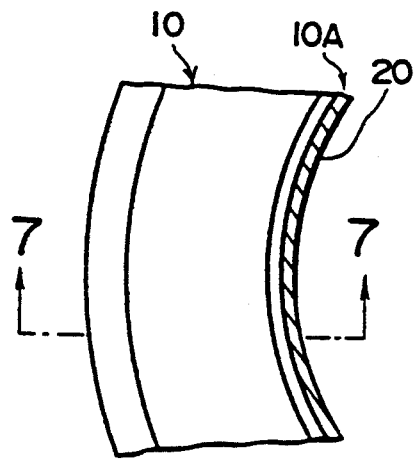
Figure 7B:
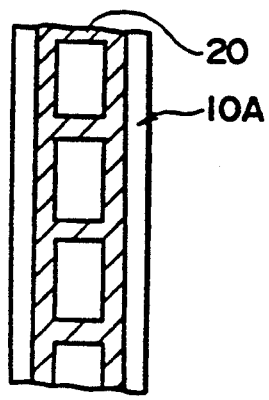
Figure 7C:
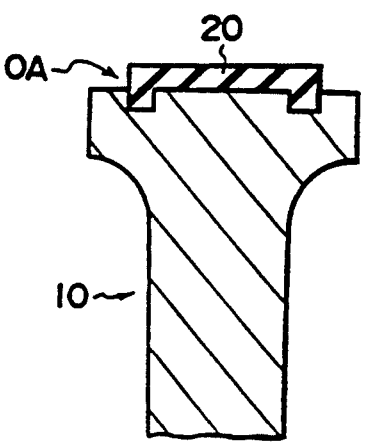

Furthermore, as shown in FIGS. 7A–7C, the resin material 20 may be provided in the shape of a ladder on the radially inward portion 10A of the core assembly 10.

Figure 8A:
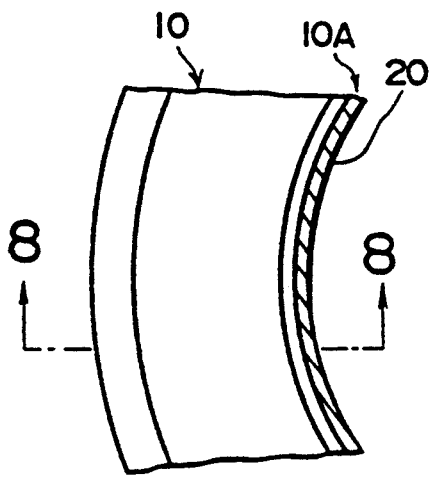
Figure 8B:
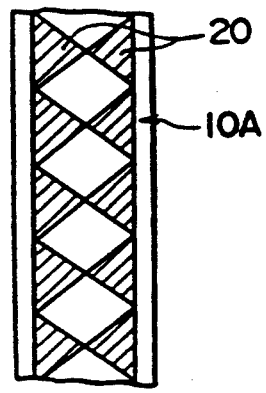
Figure 8C:
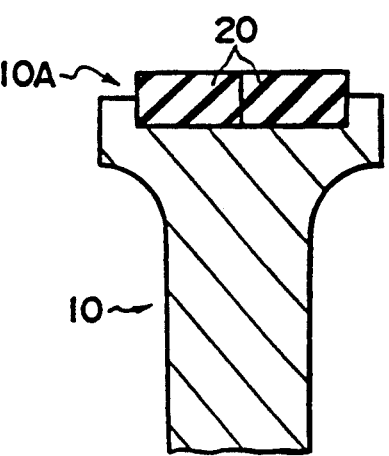

Also, as shown in FIGS. 8A–8C, the resin material 20 may be formed in such a manner that a plurality of triangular pieces are aligned in two sets along respective sides of the radially inward portion 10A of the core assembly 10 with their apexes facing each other.

Thus, it will be appreciated that the above-described configurations of the resin material 20 are only illustrative, and that various other modifications may be adopted.

TEST EXAMPLES

Figure 9A:
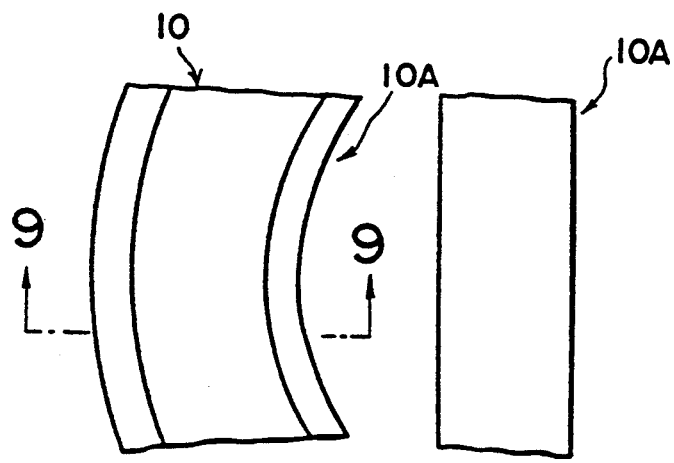
FIGS. 9A–9C are fragmentary diagrams of a conventional core assembly for a pneumatic tire.
Figure 9B:
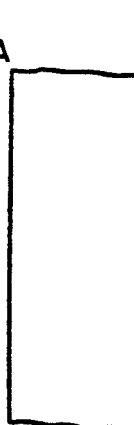
Figure 9C:
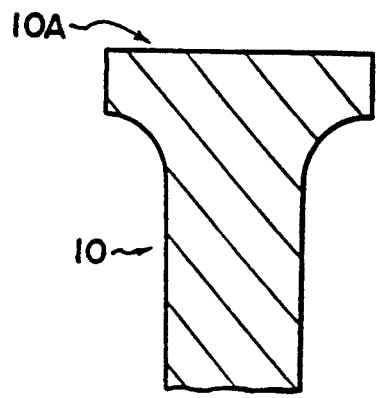

A test was conducted after core assemblies according to Comparative Examples 1 and 2 (in which the resin material 20 is not provided on the radially inward portion 10A of the core assembly 10 in any of the cases as shown in FIG. 9) and those trial-manufactured according to Examples 1-9 under the specifications shown in Table 1 were mounted in pneumatic tires (size: 195/70R14, rim size: 5 1/2J 14). These pneumatic tires were each mounted on the front wheel on the left-hand side of the test vehicle. Break-in was then performed over a distance of about 50 km under a normal pressure (2.0 kg/cm$^2$) at a speed of 60-100 km/h, with the internal pressure set to 0 kg/cm$^2$, and the vehicle being run on an ordinary road at a speed of 60 km/h while a load of 0.8 times the normal load was applied to the tire. Then, the distance until the tire or the core assembly was damaged was measured for each tire. The results are shown in Table 1.

As shown by the results, in the Examples 1-5 and 7 and 8 to which the present invention was applied, the distance until the occurrence of damage, i.e., the flat-running distance, was improved over Comparative Examples 1 and 2. As for Example 6, the flat-running distance was equivalent to that of Comparative Example 2. As for Example 9, the flat-running distance was slightly inferior to that of Comparative Example 2. In both of these cases, however, the flat-running distance improved substantially as compared with Comparative Example 1.

In addition, in all of Examples 1-9 to which the present invention was applied, the weight was reduced substantially in comparison with Comparative Example 2.

Thus, if an overall evaluation is made in terms of both the flat running distance and the weight, it can be appreciated that Examples 1 to 9 in accordance with the present invention were improved substantially over Comparative Examples 1 and 2.

What is claimed is:

1. A core assembly for a pneumatic tire, which is assembled into an annular configuration by connecting opposite ends of two or more arcuate members, capable of being fitted annularly to with an outer peripheral surface of a well portion of a rim with said pneumatic tire mounted thereon, and is adapted to rotate as an outer surface of said core assembly comes into contact with an inner peripheral surface of a crown portion of said pneumatic tire and an inner peripheral surface of said core assembly slides over said outer peripheral surface of said well portion of said rim if said pneumatic tire collapses owing to a decline in internal pressure thereof, the core assembly further comprising:

a sliding portion encompassing at least a portion of said inner peripheral surface of said core assembly and formed of a resin material having a good sliding property and a high heat resistance, said sliding portion being capable of sliding over said outer peripheral surface of said well portion; and the entire remaining portion, excluding said sliding portion, formed of a light metal material having a high rigidity and a low specific gravity.

2. A core assembly for a pneumatic tire according to claim 1, wherein said resin material is selected from a group consisting of polyamide resin, polyimide resin, polyarylate resin, polyacetal resin, phenol resin, a resin whose sliding property and heat resistance are substantially equivalent to those of said resins, a mixture of two or more kinds of said resins, a resin in which a filler is mixed in at least one kind of said resins, and a resin in which a reinforcing material is added to at least one of said resins.

3. A core assembly for a pneumatic tire according to claim 2, wherein said resin material, in terms of physical properties thereof, has a heat deformation temperature of at least 180° C. (18.6 kg/cm$^2$) and a critical PV value of at least 100 kg/cm$^2$·cm/sec.

4. A core assembly for a pneumatic tire according to claim 1, wherein said light-metal material is selected from a group consisting of aluminum, magnesium, and an alloy thereof.

TABLE 1

| Kind of core ass'y | Comparative Example 1 | Comparative Example 2 | Example 1 | Example 2 | Example 3 | Example 4 | Example 5 | Example 6 | Example 7 | Example 8 | Example 9 |
|---|---|---|---|---|---|---|---|---|---|---|---|
| Material of inner peripheral portion of core ass'y | aluminum | resin A (note) | resin A | Resin B | Resin B | Resin C | Resin D | Resin C | Resin B | Resin A | Resin B |
| Material of portion excluding inner peripheral portion of core ass'y | aluminum | resin A | aluminum | aluminum | aluminum | aluminum | aluminum | aluminum | aluminum | magnesium | magnesium |
| Configuration of inner peripheral portion of core ass'y | FIG. 9 | FIG. 9 | FIG. 4 | FIG. 7 | FIG. 5 | FIG. 4 | FIG. 6 | FIG. 6 | FIG. 8 | FIG. 4 | FIG. 6 |
| Flat running distance (index) | 100% | 203% | 209% | 211% | 210% | 213% | 215% | 203% | 209% | 207% | 193% |
| Weight (index) of core ass'y | 100% | 327% | 113% | 111% | 113% | 118% | 103% | 105% | 109% | 104% | 97% |
| Form of damage | damage to core ass'y | damage to tire | damage to tire | damage to tire | damage to tire | damage to tire | damage to tire | damage to tire | damage to tire | damage to tire | damage to tire |

Notes:
Resin A: polyamide resin
Resin B: polyacetal + fluorinated ethylene (5%)
Resin C: fluorinated ethylene + carbon resin (5%)
Resin D: polyamide + graphite (25%)

5. A core assembly for a pneumatic tire according to claim 1, wherein said sliding portion is provided over an entire surface of said inner peripheral surface of said core assembly.

6. A core assembly for a pneumatic tire according to claim 1, wherein said sliding portion is disposed annularly on a widthwise central portion of said inner peripheral surface of said core assembly.

7. A core assembly for a pneumatic tire according to claim 1, wherein two rows of said sliding portion are provided annularly in the vicinity of widthwise opposite ends of said inner peripheral surface of said core assembly, respectively.

8. A core assembly for a pneumatic tire according to claim 1, wherein said sliding portion is provided annularly in the form of a lattice on a widthwise central portion of said inner peripheral surface of said core assembly.

9. A core assembly for a pneumatic tire according to claim 1, wherein said sliding portion is formed such that two rows of triangular pieces respectively having bases of a substantially identical, triangular configuration continuing annularly substantially along a widthwise central line of said inner peripheral portion of said core assembly are arranged in such a manner that apexes of said triangular pieces face each other about the widthwise central line of said inner peripheral portion of said core assembly.

* * * * *